April 24, 1934.   S. H. BYRAM   1,956,524
AQUARIUM
Filed Jan. 6, 1933
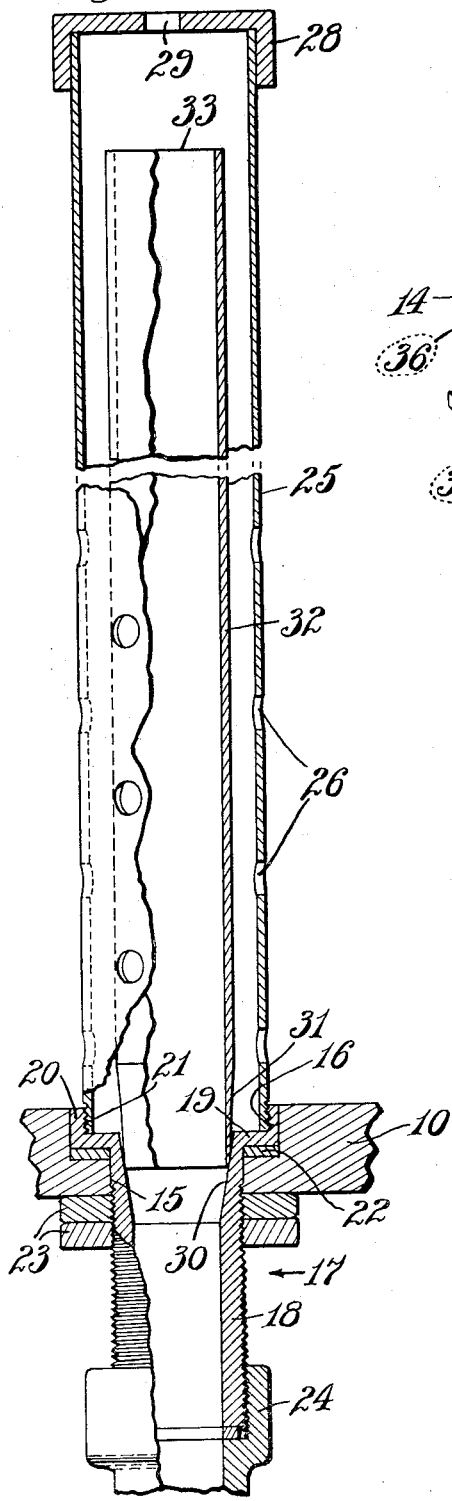
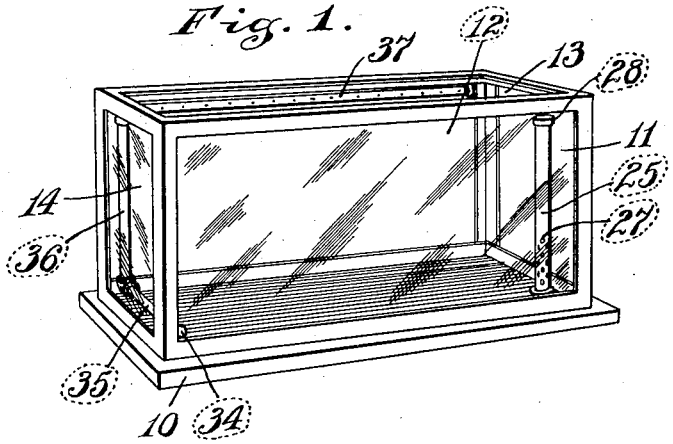
INVENTOR.
Stanley H. Byram,
BY
ATTORNEYS Patented Apr. 24, 1934

1,956,524

UNITED STATES PATENT OFFICE 1,956,524

AQUARIUM

Stanley H. Byram, Martinsville, Ind., assignor to Grassyfork Fisheries, Inc., Martinsville, Ind., a corporation of Indiana Application January 6, 1933, Serial No. 650,494

4 Claims. (Cl. 137—21)

The present application relates to liquid containers, and more particularly to aquariums; with particular consideration for the means for providing a flow of water through the aquarium.

A primary object of the invention is to provide a continuous flow of water through an aquarium, such flow to be a real circulation, with a minimum of stagnation. A further object of the invention is to provide means whereby aerated water will be supplied to the surface of the water standing in an aquarium, and whereby water will be withdrawn from adjacent the bottom of the aquarium, while maintaining a constant level of water in the aquarium considerably above the uppermost point of withdrawal. A further object of the invention is to provide means whereby water supplied to the aquarium will be relieved of a material portion of the gases entrained or dissolved in such water which would be harmful to the life in the aquarium.

A still further object of the invention is to provide circulating means for an aquarium of such character as to tend to reduce the concentration of carbon dioxide in the water and to increase the concentration of oxygen in the water. A further object of the invention is to provide circulating means for an aquarium of such character as to effect a reasonably high degree of elimination from the aquarium of fish droppings. A further object of the invention is to provide, in an aquarium, an outlet of such character as to withdraw water from a level adjacent the bottom of the aquarium, while maintaining a water level in the aquarium much higher than the level of the point of withdrawal; such outlet being of such character as to permit, upon manipulation, complete drainage of the aquarium therethrough. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a perspective view of an aquarium equipped with inlet and outlet means constructed in accordance with the present invention; and Fig. 2 is an enlarged elevation of the outlet means, parts being shown in section for clarity of illustration.

Referrng more particularly to the drawing, it will be seen that I have illustrated an aquarium comprising a base 10, front and rear walls 11 and 12, and end walls 13 and 14. In the claims, I have designated the walls 11, 12, 13, and 14 by the generic term "side walls".

At a point adjacent the corner between the walls 11 and 13, the base 10 is formed with an outlet port 15 countersunk as at 16. A spud, indicated generally at 17, comprises an externally threaded shank 18 the upper end of which is formed with a laterally outturned flange and an annular flange 20, coaxial with the shank 18, and internally threaded as at 21. Preferably, a washer 22 is interposed between the flange 19 and the base of the counterbore 16 to provide a water tight fit, and said spud is held in place by a pair of nuts 23 threaded on the shank 18 and abutting the undersurface of the base 10. When so positioned, the upper surface of the flange 20 lies flush with the upper surface of the base 10, whereby all of the water in the aquarium may be drained through said spud 17. The free end of the shank 18 has threaded thereto a coupling 24 connecting said spud 17 with the sewer, or, if preferred, with a water conditioning and circulating plant.

The lower end of a tube 25 is threaded for engagement with the threads 21 of the flange 20. Throughout a portion of its length adjacent the lower end thereof, said tube 25 is formed with ports or perforations 26, said perforations being dispersed over the surface of said tube. As is clearly shown in Fig. 1, however, the uppermost one 27 of said ports 26 is positioned considerably below the level of liquid which is normally to be maintained in the aquarium; so that it may properly be said that the tube 25 draws liquid from adjacent the bottom of the aquarium. Above the point 27, the tube 25 is imperforate as to its side walls. A cap 28 substantially closes the upper end of tube 25, but said cap is preferably provided with a small aperture 29 therein to prevent any possibility of siphoning.

A portion of the bore of the spud 17 immediately adjacent the flange 19 is tapered downwardly, as at 30. The tapered lower end 31 of an inner tube 32 is received in the tapered portion 30 of the bore of the spud 17, whereby said tube 32 is held in upright position within the tube 25; and whereby the bore of the spud 17 is sealed against direct flow of liquid thereto from said ports 26. The upper end 33 of the tube 32 is open, as shown.

It will be obvious that, when the tubes 25 and 32 are in position, liquid introduced into the aquarium will flow through the ports 26 into the space between the interior wall of the tube 25 and the exterior wall of the tube 32. As the liquid level in the aquarium builds up, the level within the tube 25 will likewise build up until finally liquid will overflow the upper open end 33 of the tube 32. The level within the aquarium will thus be maintained in the plane of the end 33 of the tube 32, so long as liquid is supplied to the aquarium at a rate not exceeding the flow capacity of the tube 32 and spud 18. The provision of the port 29 prevents the possibility of siphoning the aquarium dry through the tube 33.

At a point adjacent the corner between the walls 11 and 14, the base 10 is formed with an aperture 34 receiving an inlet fitting to which is connected a pipe 35 leading toward the corner between the walls 14 and 12. A pipe 36 extends upwardly along the wall 12 to a point above the normally maintained liquid level, and a spray pipe 37 is connected to the upper end of the pipe 36, said spray pipe 37 extending substantially throughout the length of the wall 12 and being, throughout its length, positioned above the normally maintained level of the liquid within the aquarium.

The advantage of positioning the inlet port and the outlet port adjacent the same wall 11 will be obvious; this arrangement permits the positioning of pipes outside the aquarium adjacent a room wall.

In the normal operation of the disclosed organization, liquid is introduced into the aquarium in a comparatively fine spray through the small ports in the spray pipe 37. Most city water contains chlorine in a concentration which is injurious to fish. As the water is sprayed through the air before it falls upon the surface of the body of water in the aquarium a certain amount of the chlorine held in the water is dissipated because of the spraying action. At the same time, the concentration of the air in solution is increased, in a manner which is well understood. Thus it will be apparent that it is highly desirable, where water to feed an aquarium is taken from ordinary city mains, to introduce the water to the aquarium in the manner herein disclosed.

It will also be obvious that, if the ordinary type of level-maintaining outlet tube, comprising a single tube projecting upwardly to the level which it is desired to maintain and open at its upper end, were used in conjunction with the above-described type of inlet means, the fresh water laid on the top of the body of water in the aquarium would be skimmed off by the outlet tube, leaving a large body of stagnant and unaerated water within the aquarium. It will thus be seen that there is distinct cooperation between the particular type of inlet means and the particular type of outlet means disclosed herein.

It is generally understood that fish, like humans, inhale and absorb oxygen and exhale into the circumambient medium carbon dioxide. It is also well understood that, if the oxygen content of the water is depleted and the carbon dioxide content is increased beyond known limits, the fish in the water cannot live.

There are many water plants which, like many plants which grow in the air, inhale and absorb carbon dioxide and exhale to the circumambient medium oxygen. It is primarily for this reason that water plants are placed in most aquariums.

It will be obvious that the concentration of carbon dioxide and of oxygen in solution in the water will not always be uniform throughout a given body of water. It will also be obvious that increments of the body of water which contain an excess of oxygen will be lighter than those increments of the main body of water which contain an excess of carbon dioxide. It follows that the concentration of the oxygen decreases, and the concentration of carbon dioxide increases, from the surface of the body of water to the bottom thereof. The ordinary type of outlet means skims off the water which is high in oxygen content and leaves undisturbed the portions of the body of water which are high in carbon dioxide content. The construction of the present invention, on the other hand, withdraws water from those areas in which the carbon dioxide content is high and leaves relatively undisturbed those portions of the water which are high in oxygen content.

Since water is introduced to the aquarium at the surface, and in a region remote from the outlet port which is adjacent the bottom of the body of the water, it will be clear that a very definite circulating flow of current will exist within the aquarium. Since this current flows from the surface of the water downwardly and toward the outlet, it has a decided tendency to scavenge from the bottom of the aquarium the droppings of the fish and to remove them from the aquarium. This action is decidedly advantageous since, if the droppings are permitted to accumulate in the aquarium they will eventually evolve gases which will rise in bubbles and escape from the surface of the liquid into the room.

I claim as my invention:

1. The combination with a liquid container having a countersunk outlet port in its base, of a spud having a threaded shank projected through said port and having an enlarged, internally threaded annular flange received in said countersunk port, the upper surface of said flange lying flush with the upper surface of said base, a tube having its lower end threadedly received in said flange, said tube being formed, adjacent its lower end, with a plurality of radial ports, and a second tube received, within said first tube, said second tube being open at its upper and lower ends but having imperforate side walls, and the lower end of said second tube being received within the shank of said spud to seal said spud against direct flow of liquid enter said ports.

2. The combination with a liquid container having a countersunk outlet port in its base, of a spud having a threaded shank projected through said port and having an enlarged, internally threaded annular flange received in said countersunk port, the upper surface of said flange lying flush with the upper surface of said base, a tube having its lower end threadedly received in said flange, said tube being formed, adjacent its lower end, with a plurality of radial ports, and a second tube received within said first tube, said second tube being open at its lower end and provided with an opening at a level above the uppermost one of said ports, the walls of said second tube being imperforate below the level of said opening, and the lower end of said second tube being received within the shank of said spud to seal said spud against direct flow of liquid entering said ports.

3. The combination with a liquid container having an outlet port in its base, of a liquid-level controlling drainage outlet structure comprising a tubular element with the lower end projected through said outlet port and having a perforated wall above the bottom of the container and also having an internal tube-seat intermediate its length, and a tube of smaller diameter received within said tubular element and removably associated with said tube-seat, said last-named tube being imperforate throughout its length and open at its top, and said tube extending upwardly from said tube seat within said tubular element.

4. As an article of manufacture, a drainage outlet structure for aquariums and like structures comprising a main tubular body provided with a plurality of longitudinally spaced perforations and with an internal tube-seat intermediate its length, and a smaller tube having one end removably associable with said tube-seat by a substantially water tight connection, said smaller tube being imperforate in that portion of its length normally disposed within or below the plane of the uppermost of the perforations of the tubular structure.

STANLEY H. BYRAM.